United States Patent
AxElsson

(10) Patent No.: US 6,549,841 B1
(45) Date of Patent: Apr. 15, 2003

(54) METHOD AND DEVICE FOR ASSISTING A DRIVER OF A VEHICLE

(75) Inventor: Roger AxElsson, Svenljunga (SE)

(73) Assignee: Thoreb AB, Västra Frölunda (SE)

( * ) Notice: Subject to any disclaimer, the term of this patent is extended or adjusted under 35 U.S.C. 154(b) by 0 days.

(21) Appl. No.: 10/069,549

(22) PCT Filed: Aug. 25, 2000

(86) PCT No.: PCT/SE00/01637

§ 371 (c)(1), (2), (4) Date: Jul. 10, 2002

(87) PCT Pub. No.: WO01/15927

PCT Pub. Date: Mar. 8, 2001

(30) Foreign Application Priority Data

Aug. 27, 1999 (SE) .............................................. 9903056

(51) Int. Cl.⁷ .................................................. G06G 7/76
(52) U.S. Cl. .............................. 701/70; 701/79; 701/82; 701/121; 73/117.2
(58) Field of Search .............................. 701/66, 70, 78, 701/79, 82, 84, 101, 110, 121; 73/117.2

(56) References Cited

U.S. PATENT DOCUMENTS

| 3,725,921 A | 4/1973 | Weidman et al. |
| 4,241,403 A | 12/1980 | Schultz |
| 4,291,383 A * | 9/1981 | Tedeschi et al. ............ 701/102 |
| 5,555,503 A | 9/1996 | Kyrtsos et al. |
| 5,610,815 A | 3/1997 | Gudat et al. |

FOREIGN PATENT DOCUMENTS

| EP | 693411 A1 | 1/1996 |
| WO | 9729470 A1 | 8/1997 |

* cited by examiner

Primary Examiner—Gertrude Arthur
(74) Attorney, Agent, or Firm—Birch, Stewart, Kolasch & Birch, LLP

(57) ABSTRACT

The invention relates to a method and a device for assisting a driver of a vehicle, said vehicle having an engine and a braking system, an accelerator that conveys the driver's wishes concerning acceleration to the engine, and a brake pedal that conveys the driver's wishes concerneing retardation to the braking system. In accordance with the method a speed profile is determined for the driving distance, which speed profile comprises a relation between a speed set point and position. Furthermore, the engine and the braking system are controlled on the basis of the speed profile and at least one actuator influences the accelerator or braking pedal of the vehicle in accordance with said control. The driver is permitted to override the influence of the actuator only if a force that is greater than a predetermined threshold value is applied on one of the pedals.

11 Claims, 4 Drawing Sheets

METHOD AND DEVICE FOR ASSISTING A DRIVER OF A VEHICLE

This application is the national phase under 35 U.S.C. §371 of PCT International Application No. PCT/SE00/01637 which has an international filing date of Aug. 25, 2000, which designated the United States of America.

TECHNICAL FIELD

The present invention relates to a method and a device for assisting a driver of a vehicle, said vehicle having an engine and a braking system, an accelerator that conveys the driver's wishes concerning acceleration to the engine, and a brake pedal that conveys the driver's wishes concerning retardation to the braking system.

The method in accordance with the invention comprises the steps of, taking into consideration several factors, such as a division of a specific driving distance into shorter segments, determining a speed profile for the driving distance, which speed profile comprises a relation between a speed set point and position, and regularly reading the current speed set point from the speed profile.

BACKGROUND ART

The automatic control of vehicles, particularly commercial vehicles such as buses, has been studied with the objective of minimising emission from vehicles and minimising energy consumption. In the article entitled "Control strategies for an electric Hybrid bus adapted to a specific route", by Jan Andersson, Roger Axelsson and Bengt Jacobsson, presented at AVEC1998, the concept of "advisor" was introduced. This "advisor", which constitutes a part of the control system of the vehicle, calculates a suitable speed profile on the basis of the planned route of the vehicle, i.e. the speed the vehicle should keep at each moment of the journey. The advisor regularly receives data as to the speed and position of the vehicle and the current time, in order to update the speed profile.

This speed profile shall then influence the driver with a view to achieving smoother driving and thus a more optimal energy consumption and level of emission. In the article mentioned above the advisor influences the control system for the vehicle's engine directly. The actions of the driver in depressing or releasing the accelerator and brake pedals are regarded as input signals to the advisor, which thus acts as a kind of filter.

This entails a possible traffic danger for two reasons. In the first place the driver does not have sufficiently direct contact with the control system of the vehicle. The advisor, which in a mathematical model follows the behaviour of the driver, can hardly be prepared for all human behaviour. "Misunderstandings" may consequently arise between driver and advisor. In the second place there is a risk of the driver being lulled into playing an all too passive part since an advisor constantly supervises his behaviour.

One problem with the use of such an advisor is to activate the driver sufficiently so that his driving behaviour will be changed without causing a traffic danger due to the driver becoming too passive.

OBJECTS OF THE INVENTION

The object of the present invention is to solve the above problem and provide a method and a device for assisting a driver of a vehicle, such as a bus, to promote a smoother style of driving with lower levels of emission and lower fuel consumption.

Another object of the invention is to further develop the concept of an "advisor", as mentioned above, and to implement this concept in a vehicle.

SUMMARY OF THE INVENTION

To achieve the above objects the invention provides a method of the type described above, characterised by the steps of controlling the engine and the braking system on the basis of the speed set point, by means of at least one actuator influencing the accelerator or braking pedal of the vehicle in accordance with said control, determining whether the driver is applying a force on one of the pedals that is greater than a predetermined threshold value and, if such is the case, allowing the driver to override the influence of the actuator.

The method in accordance with the invention enables a vehicle to be controlled in accordance with an optimal speed profile in order to minimise emission and fuel consumption. At the same time the driver is given information as to the signals transmitted to the engine and braking system by the regulator. If the driver deems it necessary he can override the system, but only by applying sufficient force on the pedals. This force is determined to a suitable magnitude by means of tests depending, for instance, on the strength of the driver.

The force applied by the driver on a pedal may be determined by the pedal being movable against the action of a spring force, and a sensor determining when the pedal has been moved a specific distance. The force applied by the driver on a pedal may also be determined by a piezoelectric element.

The information utilised by the method is in the first placed related to the relevant distance to be driven, which is suitably divided into segments, each segment being associated with a number of factors related to road conditions and speed limits, for instance, and to the time table and planned stops along the route.

This information is entirely independent of the vehicle and may be included in a common information package tied to a specific route.

Secondly, the method utilises information related to the capabilities of the vehicle, such as engine power, transmission, inertia, etc. This information is similarly entirely independent of the route and may be included in an information package tied to a specific type of vehicle.

Thirdly, the method utilises continuous information from the internal data system of the vehicle, such as speed, position and time. This information is already used in modern public transport vehicles and no technical problems are entailed in obtaining it.

The step of controlling the engine and the braking system on the basis of the speed set point can be performed by direct activation of the accelerator and the brake pedal. This gives a particularly clear coupling between the control of the engine and braking system on the one hand, and the position of the pedals on the other hand.

In accordance with the invention a device is also provided for performing the method.

BRIEF DESCRIPTION OF THE DRAWINGS

The present invention will be described in more detail in the following with reference to the accompanying drawings illustrating preferred embodiments of the invention by way of example.

DESCRIPTION OF A PREFERRED EMBODIMENT

The embodiment of the invention described in the following, which shall only be looked upon as an example, relates to application in a bus with automatic transmission that follows a route with several bus stops according to a specific time table. The invention can naturally be used to advantage in numerous other situations.

Figure 1:
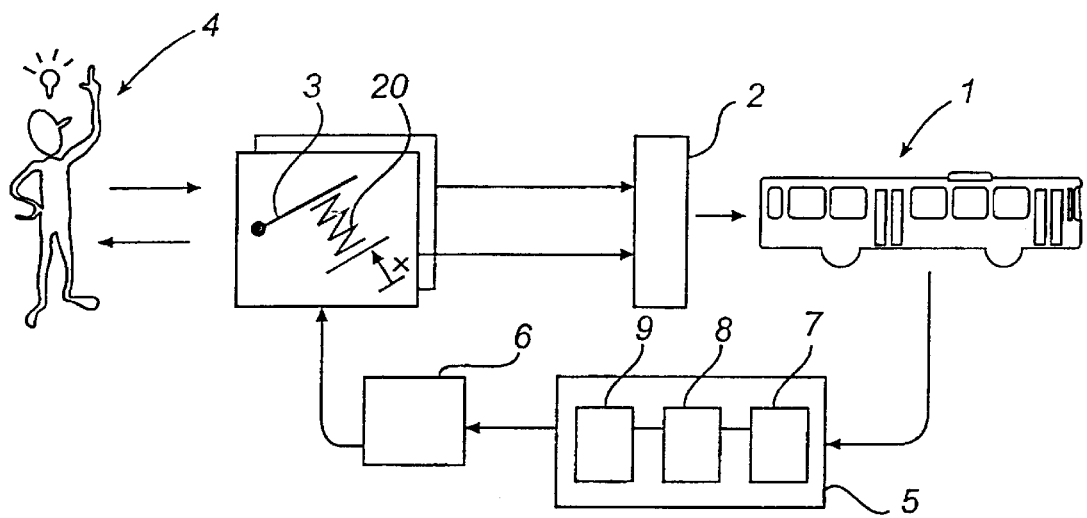
FIG. 1 shows generally a control system for a vehicle provided with a device in accordance with the invention.

FIG. 1 shows schematically how the method and the device in accordance with the invention are implemented. The engine and braking system of the bus I are controlled by one or more control systems 2 which are influenced by instructions from the driver 4 via the gas and brake pedal 3. If the vehicle is of hybrid type the braking system comprises means, such as a generator, in order to take advantage of the braking energy. In accordance with the invention a device termed an advisor 5 is also arranged to influence the pedals via a regulator 6. The advisor 5 comprises a database 7 containing data as described below, and means 8 to determine the speed profile. The advisor also comprises a memory unit 9. The regulator 6, consisting of substantially known hardware or software, is arranged to convert signals from the advisor 5 to deflections of the pedals 3.

Figure 2:
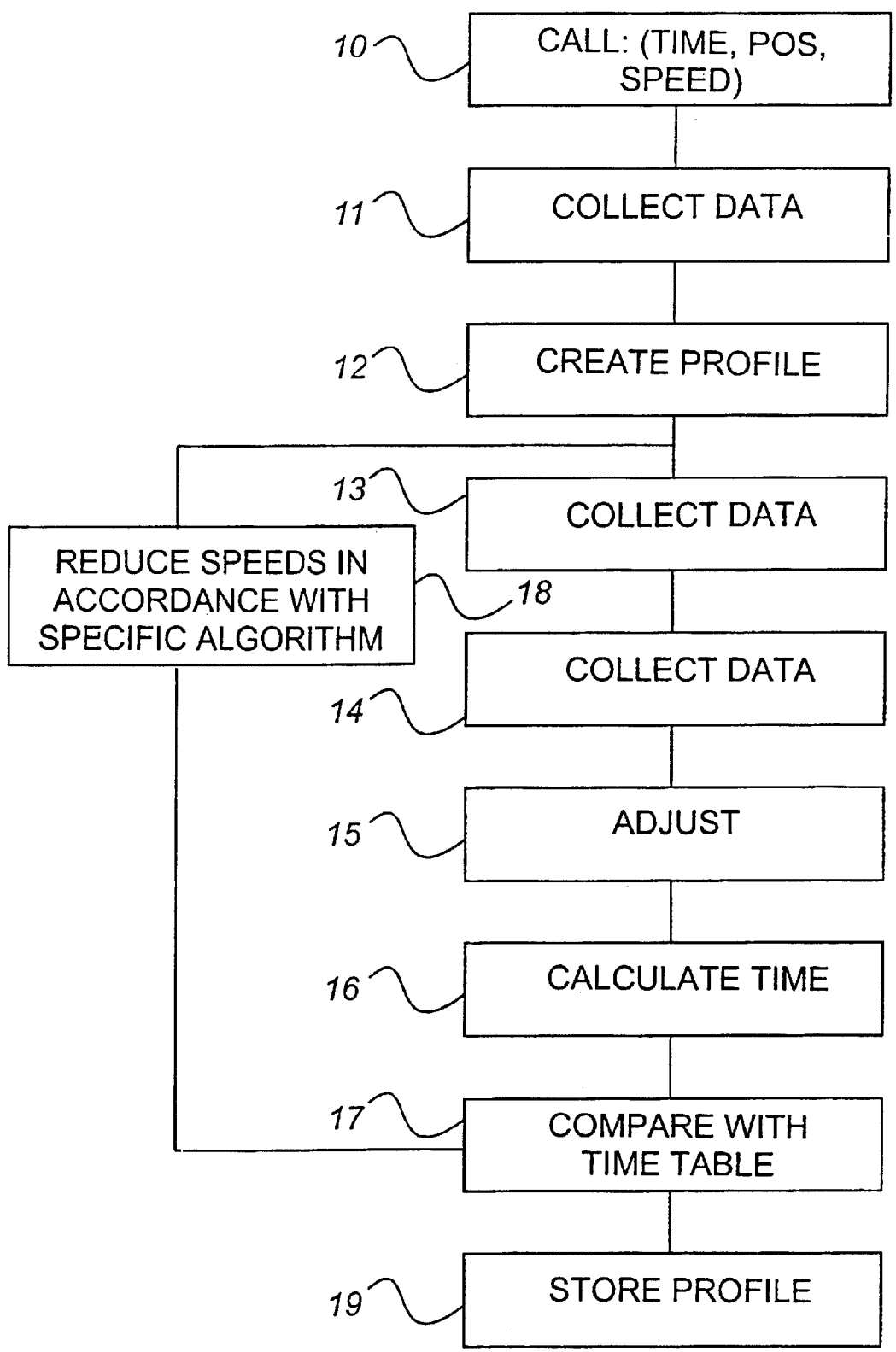
FIG. 2 shows a flow chart for a part of the method in accordance with the invention.

According to the invention, the task of the advisor is to determine how the vehicle is to be driven from its current position to the next stop, e.g. a bus stop. A flow chart of how the advisor operates is shown in FIG. 2. The input data at each call are position, time and speed. The result of each call is a speed profile describing how the vehicle is to be driven to the next planned stop. The speed profile comprises a relation between speed set point and position, which can of course be converted by simple mathematics to a relation between speed and time. The routine illustrated in FIG. 2 is called regularly during the journey since unforeseen events, such as red lights or sudden braking, may necessitate adjustment of the speed profile.

The database 7 contains information concerning a division of the relevant route into several segments, each having a length of 10–100 m, for instance, and concerning a maximum suitable speed along each segment. A plurality of factors, such as speed limits, road quality, pedestrian crossings, intersections, etc. are taken into consideration when determining said maximum suitable speed along each segment.

The database 7 also contains information concerning factors associated with each segment that affect acceleration, such as incline and bends. The database 7 also contains information as to where planned stops, e.g. bus stops, are located on the route, as well as time-table information.

All this information, which is entirely independent of the vehicle, can preferably be supplied from a central database (not shown) and be regularly updated. All vehicles travelling along the same route will therefore have access to the same information and a vehicle that changes its route can be updated with new information. Updating of this type can easily be accomplished using known technology, e.g. wireless transmission with suitable communication protocols.

The database 7 also contains information about a plurality of factors specific to a vehicle, such as weight, power transmission, inertia, engine power, etc. This information thus is the same regardless of the route the vehicle is travelling at any particular time. Several factors, such as factors relating to the engine, are only updated in conjunction with service and maintenance, for instance, whereas other factors, such as weight, can be affected during the course of driving by the number of passengers carried, for instance. The degree of detail in this latter type of information is in principle limited only by the information system of the vehicle.

The first step 10 denotes calling the routine, with the time, position and speed parameters. These parameters are collected from the internal information system of the vehicle, which is suitably provided with some form of position-determining system, e.g. GPS. Information systems of this type are generally known and are becoming increasingly more usual in all types of vehicles.

In the next step 11 information is collected from the database concerning suitable maximum speeds on the route in question.

Figure 3:
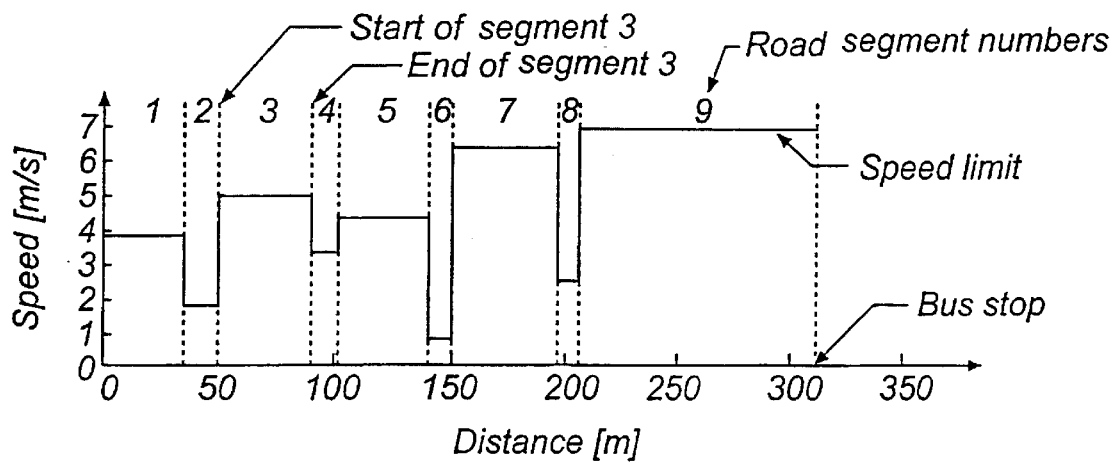
FIG. 3 shows a speed profile.

On the basis of this information the first speed profile is determined in step 12, this being defined by the vehicle following the highest suitable speed along each segment of the road. This speed profile is illustrated by way of example in FIG. 3 for a distance to be driven. Since it is not possible to instantly alter the speed of the vehicle as indicated in FIG. 3, the program control in steps 13–15 performs an adjustment of the first speed profile to the factual acceleration situation.

The previously mentioned acceleration-related factors associated with each road segment are collected in step 13, and the vehicle-related factors are collected in step 14 from the database. Calculation is then performed in step 15 to determine how the speed can be changed between the various segments.

The algorithm in step 15 can utilise information about several segments ahead, in order to coincide better with the original speed profile. A reduction in speed between two segments might, for instance, be followed by another, more substantial reduction in speed. In that case it may be necessary to entirely omit the intermediate speed level so as to enable braking to the lowest level in time.

In step 16, therefore, a somewhat more uniform speed profile has been obtained and the travel time to which this profile corresponds is calculated and compared in step 17 with the time table, read from the database 7. However, if the vehicle followed the first speed profile the travel time would normally be far too short, and an algorithm is therefore usually required which reduces the speed in a systematic manner, so that the stated travel time is maintained. After reduction in step 18 of one or more of the speed levels in the profile, steps 13–15 are repeated, and the procedure is repeated until, in step 17, the time driven coincides well with the time stated in the time table.

The speed reduction mentioned above can be achieved in many ways known per se, and only two preferred methods will be presented here by way of example.

Figure 4:
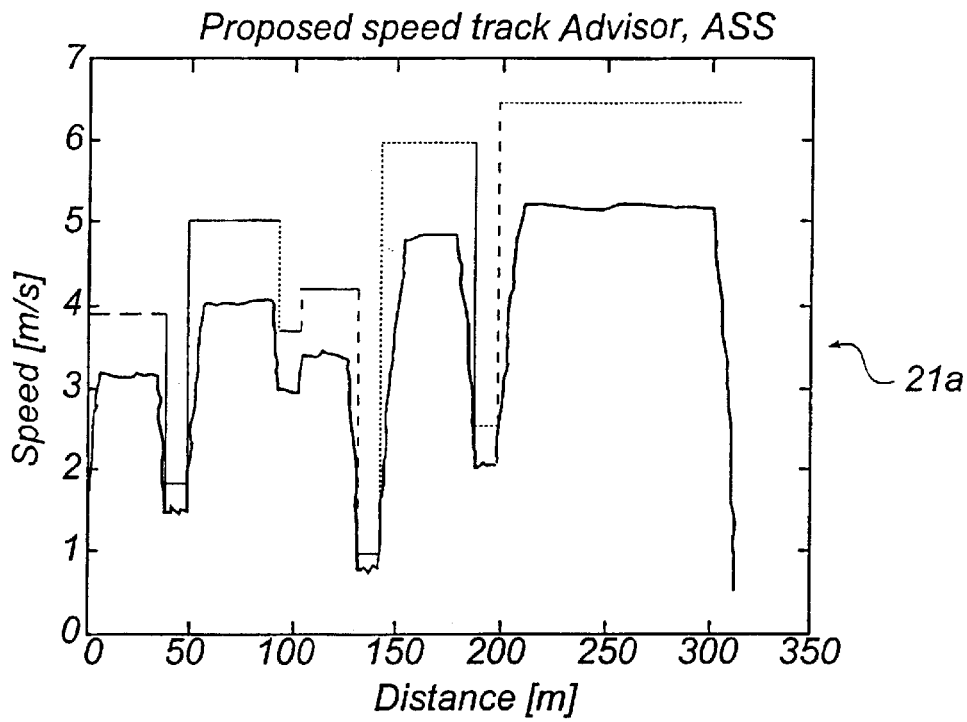
FIGS. 4 and 5 show the speed profile in FIG. 3, adjusted to comply with a time table.

A first method involves multiplying the entire speed profile by a scaling factor, thereby reducing the maximum speed proportionally in all segments. The scaling factor is determined by the iteration of steps 13–15, which gives a speed profile that complies satisfactorily with the time table. The result obtained by displacing the scaling factor and equalisation of the speed profile in FIG. 3 is shown in FIG. 4.

Figure 5:
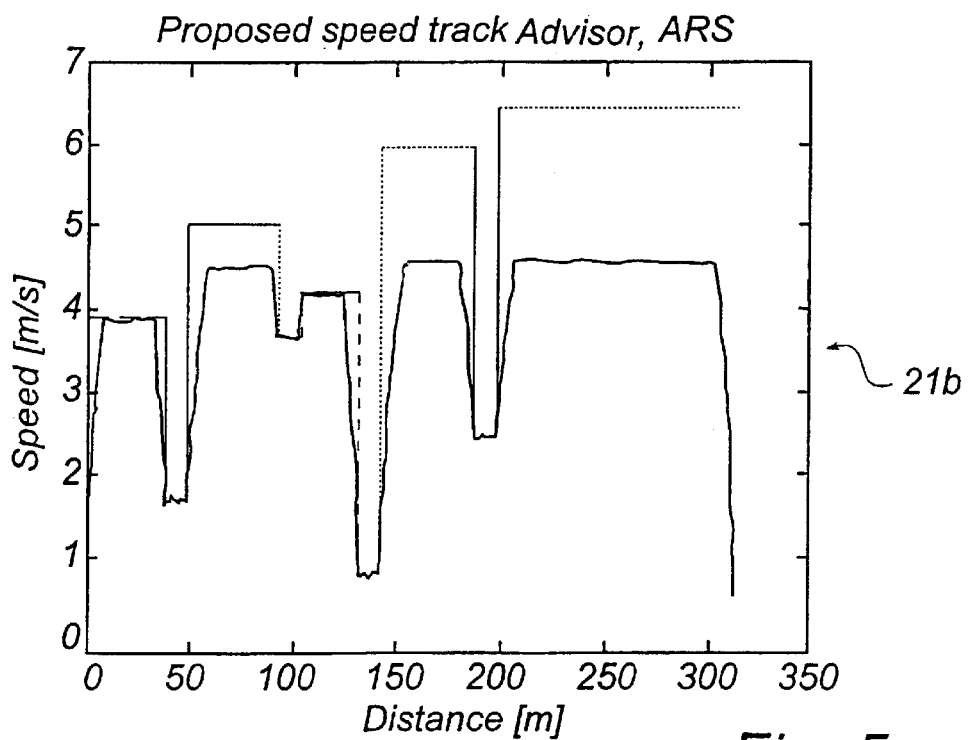

A second method involves introducing a new maximum permissible speed, and adapting the speed profile to this. In each segment that has a maximum suitable speed greater than the maximum permissible speed introduced, the speed is reduced to the latter. The maximum permissible speed that satisfactorily complies with the time table is determined by the iteration of steps 13–15. The result of such curtailment and equalisation of the speed profile in FIG. 3 is shown in FIG. 5.

After step 18 a speed profile has been determined that covers the distance from the current position to the next stop and which ensures that the vehicle keeps as well as possible to the time table.

If something has occurred preventing arrival at the bus stop at the appointed time from the current position, this will immediately be detected by the advisor at the first comparison in step 17. Examples of such incidents are traffic congestion, unusually many red lights, or other disturbances in the traffic. The driver can be advised of the expected delay and a message can also be sent to a traffic information system.

The speed profile determined in this way is stored in the memory unit 7 in step 19 and every time the speed profile is updated (after each call of the routine in FIG. 2), a new speed profile will be stored.

If the advisor is implemented in the form of software, or programmed IC circuits, the routine in FIG. 2 can be performed in an instant. Calling the routine relatively often, e.g. every second, thus constitutes no burden on the control system of the vehicle. The risk of sudden changes giving rise to major changes in consecutive speed profiles is therefore minimised. It can be said that the vehicle does not unnecessarily follow an incorrect speed profile.

The regulator 6 continuously reads a current speed set point from the latest speed profile stored in the memory unit 7 by the advisor 5 and compares this with the factual speed of the vehicle which is fed back to the regulator. The control system of the engine and the braking system is then influenced in accordance with this difference. As regards increasing speed, the regulator functions in approximately the same way as the equivalent software in a cruise control that regulates increasing speed in accordance with a speed dictated by the driver. The regulator functions in corresponding manner as regards braking, but with different control algorithms because of the different physical procedure.

In accordance with one embodiment of the invention, the speed set point is converted to a set point for the position of the pedal and braking force, and is suitably in two steps. The first step generates a set point relating to acceleration (positive or negative) based on the speed set point in relation to the factual speed of the vehicle. Several different possible control strategies can be implemented by one skilled in the art. The acceleration set point is then converted to a set point for increasing speed or braking, depending on whether the acceleration set point is positive (acceleration) or negative (retardation). The set point relating to increasing speed, which shall control the accelerator, is expressed as a pedal position, and the set point relating to retardation, which shall control the brake pedal, is expressed as a braking force.

The regulator also controls actuators e.g. stepping motors (not shown), which directly influence the accelerator or brake pedal 3 of the vehicle in relation to the control of engine and braking system. It can be said that the actuators actuate the pedals to reflect the influence the regulator exerts on engine and braking system. If a vehicle equipped with a device in accordance with the invention is not subjected to external influence, the pedals 3 will move as if an optimally driving "ghost driver" were manipulating them.

In accordance with one embodiment of the invention, the regulator controls engine and braking system of the vehicle only by directly actuating the accelerator and brake pedal. The effect of a "ghost driver" is then even more palpable.

The driver is able to override the pedals controlled by the advisor by applying foot pressure exceeding a predetermined threshold value on one of the pedals 3. The driver is permitted to override the influence of the actuator only if a force greater than the predetermined threshold value is applied on one of the pedals.

Each pedal may be provided with a spring means 20, for instance, which forces the driver first to move the pedal a distance against the spring action before the movement will affect the control system (increased speed or retardation) of the vehicle.

Figure 6:
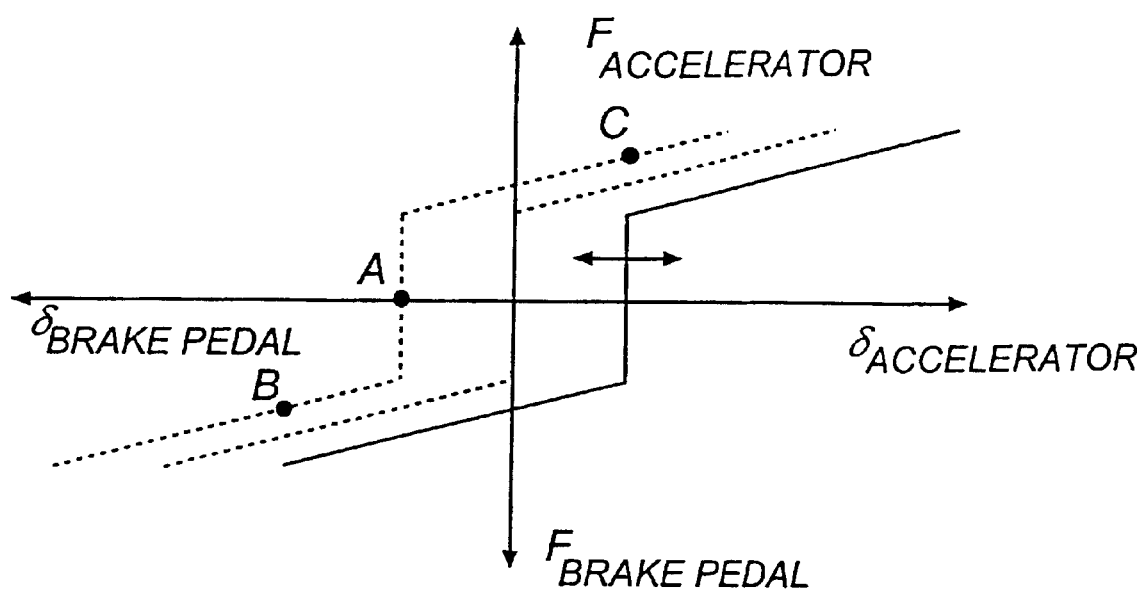
FIG. 6 shows schematically how the pedal characteristic is changed with a device in accordance with the invention.

In a simple example the spring means 20 consists of a helical spring or the like, arranged between the foot-plate of the pedal and the vehicle's link arm of the control system (see FIG. 6). A sensor (not shown) may be arranged to sense when the foot-plate has been moved a certain distance and, if appropriate, emit a signal to disconnect the actuator, thereby releasing the pedals entirely from influence of the advisor, or at least reducing the force applied by the actuator.

Another possibility is to arrange a piezoelectric element on each pedal, which senses the pressure the driver applies on the pedal. When the pressure is sufficiently high the actuators are overridden as described above.

Also in accordance with the invention, a means can be arranged that enables the driver to warn the advisor of imminent external influence, e.g. an obstacle on the road. This feature enables a form of "feed forward" of the control and gives the advisor the chance to take the new obstacle into consideration in the next call of the routine in FIG. 2. This "feed-forward" means may be more or less sophisticated and may permit the driver to indicate an assessment of the distance to the obstacle, for instance.

It will be understood that the present invention shall not be limited to the above description of preferred embodiments. Several modifications obvious to one skilled in the art are feasible within the scope of the appended claims. A vehicle may be equipped, for instance, with arrangements for controlling increased speed and retardation other than pedals. Furthermore, the factors mentioned for determining the speed profile are only to be seen as examples. Several other factors may be relevant.

What is claimed is:

1. A method for assisting a driver (4) of a vehicle (1), said vehicle having an engine and a braking system, an accelerator (3) that conveys the driver's wishes concerning acceleration to the engine, and a brake pedal that conveys the driver's wishes concerning retardation to the braking system, which method comprises taking into consideration several factors, such as a division of a specific driving distance into shorter segments, determining a speed profile (21*a*, 21*b*) for the driving distance, which speed profile comprises a relation between a speed set point and position, and regularly reading the current speed set point from the speed profile, characterised by the steps of controlling the engine and the braking system on the basis of the speed set point, by means of at least one actuator influencing the accelerator or braking pedal of the vehicle in accordance with said control, determining whether the driver is applying a force on one of the pedals that is greater than a predetermined threshold value and, if such is the case, allowing the driver to override the influence of the actuator.

2. A method as claimed in claim 1, wherein the force the driver applies on a pedal is determined by the pedal being moved a specific distance against the action of a spring force.

3. A method as claimed in claim 1, wherein the force the driver applies on a pedal is determined by a piezo-electric element.

4. A method as claimed in claim 1, wherein the factors taken into consideration in the step of determining a speed profile comprise traffic-related factors such as speed limits and expected traffic congestion.

5. A method as claimed in claim 1, wherein the factors taken into consideration in the step of determining a speed profile comprise acceleration-related factors such as the incline of the road and bends in the road.

6. A method as claimed in claim 1, wherein the step of controlling the engine and the braking system on the basis of the speed set point is performed through direct influenced on the accelerator and the brake pedal.

7. A device for assisting a driver (4) of a vehicle (1), said vehicle having an engine and a braking system, an accelerator (3) that conveys the driver's wishes concerning acceleration to the engine, and a brake pedal that conveys the driver's wishes concerning retardation to the braking system, comprising means (5, 7, 8, 9) for determining a speed profile (21a, 21b) for a specific distance, which speed profile comprises a relation between a speed set point and position, characterised by means (6) for controlling the engine and the braking system on the basis of the speed set point, at least one actuator for influencing the accelerator or braking pedal of the vehicle in accordance with said control, and means (20) for determining whether the driver is applying a force on one of the pedals that is greater than a predetermined threshold value in order, if such is the case, to override the influence of the actuator.

8. A device as claimed in claim 7, wherein the means for determining a speed profile and for conversion of the speed set point are implemented in the form of software in the control system of the vehicle.

9. A device as claimed in claim 7, wherein each pedal is arranged to be movable against spring action wherein a sensor is arranged to sense when one of the pedals is moved a certain distance.

10. A devise as claimed in claim 7, wherein a piezoelectric element is arranged on each pedal to sense when a force of a certain magnitude is applied on the pedal.

11. A method for determining a speed profile for a driving distance that is divided into segments, which speed profile comprises a relation between a speed set point and position, characterised by creating a first profile (step 12) by associating each segment with a maximum suitable speed level, smoothing out discontinuities arising between segments with different speeds (step 15), calculating the time required to drive the driving distance according to the profile determined (step 16), comparing this time with a predetermined time (step 17), if said calculated time is less than said predetermined time, reducing the speed levels in the profile (step 18) until said times substantially coincide.

* * * * *